(12) United States Patent
Branco et al.

(10) Patent No.: US 6,520,492 B1
(45) Date of Patent: Feb. 18, 2003

(54) PNEUMATIC SPRING ARRANGEMENT

(75) Inventors: Antonio Branco, Hamburg (DE); Michael Weber, Buchholz (DE)

(73) Assignee: Phoenix AG, Hamburg (DE)

( * ) Notice: Subject to any disclaimer, the term of this patent is extended or adjusted under 35 U.S.C. 154(b) by 0 days.

(21) Appl. No.: 10/019,815
(22) PCT Filed: Feb. 17, 2001
(86) PCT No.: PCT/DE01/00487
§ 371 (c)(1), (2), (4) Date: Oct. 25, 2001
(87) PCT Pub. No.: WO01/65138
PCT Pub. Date: Sep. 7, 2001

(30) Foreign Application Priority Data

Feb. 28, 2000 (DE) .......................... 100 09 236

(51) Int. Cl.⁷ .................................. F16F 5/00
(52) U.S. Cl. ....................................... 267/122
(58) Field of Search .......................... 267/64.19, 64.23, 267/64.24, 64.27

(56) References Cited

U.S. PATENT DOCUMENTS

| 4,784,376 A | * | 11/1988 | Ecktman | 267/64.27 |
| 4,787,607 A | * | 11/1988 | Geno et al. | 267/64.11 |
| 4,899,995 A | * | 2/1990 | Hoffman et al. | 267/64.24 |
| 4,921,226 A | * | 5/1990 | Pees | 267/64.21 |
| 4,946,144 A | * | 8/1990 | Geno et al. | 267/64.27 |
| 5,267,725 A | * | 12/1993 | Wode et al. | 267/122 |
| 5,374,037 A | * | 12/1994 | Bledsoe | 267/64.24 |
| 5,667,203 A | | 9/1997 | Roemer | |
| 5,941,509 A | * | 8/1999 | Avesian et al. | 267/64.24 |

FOREIGN PATENT DOCUMENTS

| DE | 195 08 980 | 3/1995 |
| DE | 199 07 656 | 2/1999 |
| EP | 295 392 | 12/1988 |
| EP | 1 031 756 | 8/2000 |

* cited by examiner

Primary Examiner—Jack Lavinder
Assistant Examiner—Benjamin A Pezzlo
(74) Attorney, Agent, or Firm—Collard & Roe, P.C.

(57) ABSTRACT

The invention relates to a pneumatic spring arrangement consisting of at least the following components: pneumatic spring bellows, a pneumatic spring cover, a pneumatic spring piston and a vibration damper having a container pipe and a piston rod. The inventive pneumatic spring arrangement is characterized in that the pneumatic spring piston is provided with an integrated clamping lock which consists of an outer ring body and an inner ring body. The bodies can be plugged into one another. The outer ring body comprises a collar and at least one spring arm which is provided with a barb. The inner ring body comprises an outer ring and an inner ring which are connected to each other in such a way that at least one plug aperture is provided for receiving the barb of the spring arm in a catching manner.

14 Claims, 2 Drawing Sheets

PNEUMATIC SPRING ARRANGEMENT

CROSS REFERENCE TO RELATED APPLICATIONS

Figure 1:
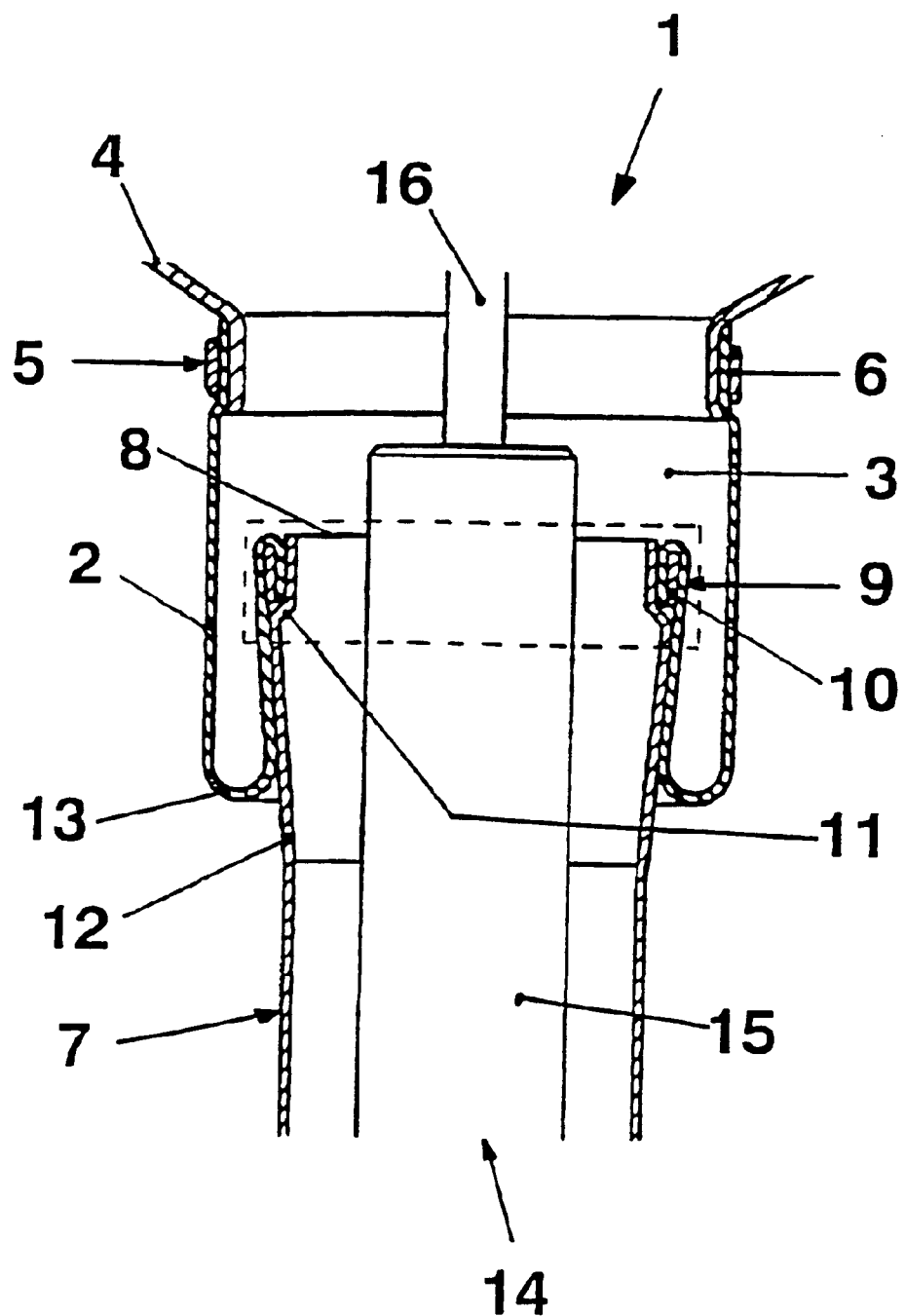

Applicants claim priority under 35 U.S.C. §119 of German Application No. 100 09 236.5 filed Feb. 28, 2000. Applicants also claim priority under 35 U.S.C. §120 of PCT/DE01/00487 filed Feb. 17, 2001. The international application under PCT article 21(2) was not published in English.

DESCRIPTION

The invention relates to a pneumatic spring arrangement as defined in the introductory part of patent claim 1.

A pneumatic spring system of the type specified herein comprising a pneumatic spring cover, a pneumatic spring piston and a pneumatic spring bellows as the important structural components of the pneumatic spring module is described, for example in DE-C-195 08 980, which uses a vibration damper. The vibration damper comprises in this connection a container tube that is at least in sections surrounded by the pneumatic spring piston, and a piston rod which is connected in a fixed manner with the core area and immerses in the container tube in a sliding manner. Furthermore, the vibration damper is equipped with a damper bearing in most cases.

Now, the construction of the pneumatic spring piston is introduced in the following in greater detail. The pneumatic spring piston comprises a face area that is arranged opposite the pneumatic spring cover with the first fastening area for securing the one end of the pneumatic spring bellows. Said face area is adjoined by the second fastening area for securing the other end of the pneumatic spring bellows. Said fastening area is provided with an undercut forming of a shoulder. Another part of the pneumatic spring piston forms the lateral roll-off surface on which the pneumatic spring bellow is capable of rolling off while forming a loop.

In German laid-open patent DE-A-199 07 656, which was published on a later date, the pneumatic spring bellows is secured on the pneumatic spring piston, in a manner such that an additional support element is used in addition to the usual clamping ring, notably in the form of a second clamping ring, a bush with a collar, or by means of a suitable design of the bellows within the fastening area.

Now, the problem of the invention is to secure for a pneumatic spring system of the type specified above the fastening of the pneumatic spring bellow on the pneumatic spring piston with inclusion of the vibration damping device in such a manner that a high tear-off force is assured combined with an easy way of installation.

Said problem is solved according to the characterizing part of claim 1 in that a clamping lock is arranged within the face area and the second fastening area, whereby the latter is comprised of at least one outer ring body and at least one inner ring body, said bodies being individual components, whereby the outer ring body, as a one-piece composite body, comprises a collar for receiving the second fastening area, and at least one spring arm extending in the axial direction and comprising a barb; and the inner ring body, the latter being a one-piece composite body as well, comprises an outer ring and an inner ring, whereby the outer ring is provided with at least one radially outwardly directed second barb extending around the shoulder of the pneumatic spring piston in a supporting manner, whereby, furthermore, the inner ring serves for centrally receiving the container tube; and whereby, furthermore, the outer ring and the inner ring are connected with one another in such a manner that at least one plug aperture is provided for receiving the first barb in a locking manner.

Useful further developments of the embodiment of the invention are specified in claims 2 to 14.

Figure 2:
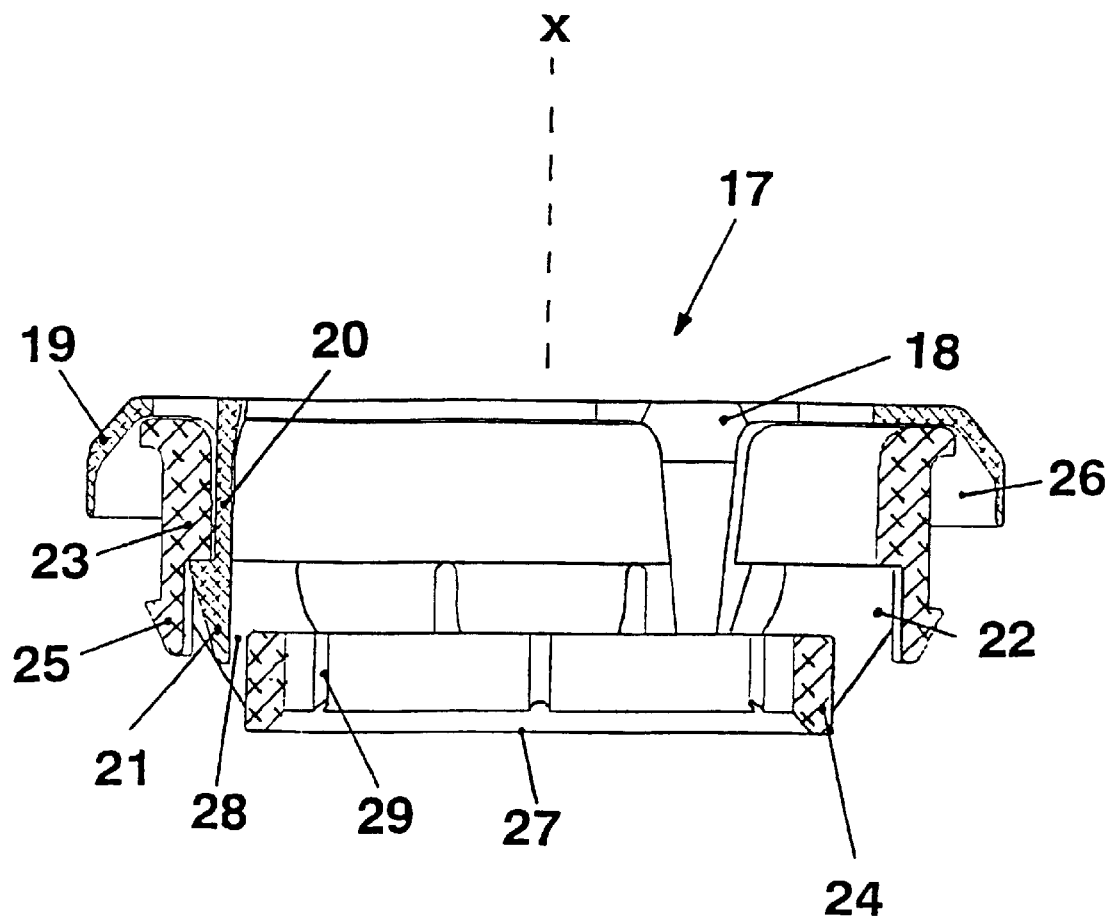

The invention is now explained in the following with the help of an exemplified embodiment and by reference to two schematic drawings, in which:

FIG. 1 shows a pneumatic spring arrangement according to the state of the art; and FIG. 2 is a detailed representation of the clamping lock.

The following list of reference numerals applies in connection with the figures:

1 Pneumatic spring arrangement
2 Pneumatic spring bellows
3 Air chamber
4 Pneumatic spring cover (pneumatic spring pot, pressure container
5 First fastening area
6 Clamping ring
7 Pneumatic spring piston (roll-off piston, immersing piston)
8 Face area
9 Second fastening area
10 Clamping ring
11 Undercut with shoulder
12 Roll-off surface
13 Loop (rolling fold)
14 Vibration damper (shock absorber)
15 Container tube
16 Piston rod
17 Clamping lock
18 Outer ring body
19 Collar
20 Spring arm
21 First barb
22 Inner ring body
23 Outer ring
24 Inner ring
25 Second barb
26 Space for receiving the second fastening area
27 Central space for receiving the container tube
28 Plug aperture
29 Holding ribs.

FIG. 1 shows by cutouts a pneumatic spring arrangement 1, whereby the pneumatic spring bellows 2 is made of elastomeric material and encloses an air chamber 3 having an elastic volume. In most cases, the pneumatic spring bellows is provided in this connection with an embedded reinforcement in the form of an axial bellows or cross-layered bellows.

The pneumatic spring cover 4, which usually has the shape of a pot and, furthermore, frequently serves as a pressure container, comprises a first fastening area 5 on which the one end of the pneumatic spring bellows 2 is secured by means of a clamping ring 6.

The pneumatic piston 7, as a tubular structural component, comprises a face area 8 that is arranged opposite the pneumatic spring cover 4. The face area is laterally adjoined by the second fastening area 9 for securing the other end of the pneumatic spring bellows 2. Said end is secured by means of a clamping ring 10 as well, whereby the end of the bellows is beaded around the clamping ring. Said fastening area is provided with an undercut, forming a shoulder 11. Furthermore, as the pneumatic spring bellows 2 is elastically yielding inwards, a loop 3 is formed that is able to roll off on the roll-off surface 12 of the pneumatic spring piston.

Furthermore, the pneumatic spring arrangement 1 is comprised of a vibration damper 14 that is surrounded at least in sections by the pneumatic spring piston 7 and comprises a piston rod 16. The piston rod is fastened in this connection to the core area of the pneumatic spring cover 4 in a fixed manner, in particular in conjunction with a damper bearing, and immerses in the container tube in a sliding manner. Such a pneumatic spring system is referred to also as a pneumatic spring leg, whereby reference is made to the above-cited patent specification DE-C-195 08 980 with respect to the details of the construction.

The dotted area outlined in FIG. 1, which now comprises the novel clamping lock, is now described in greater detail in the following with the help of FIG. 2.

According to FIG. 2, the clamping lock 17 is comprised of an outer ring body 18 and an inner ring body 22, which, in terms of manufacturing technology, are two individual structural components that can be plugged into one another. Said two ring bodies in turn are particularly made of plastic and each are realized in the form of one single piece.

The outer ring body 18 comprises a ring-shaped collar 19 as well as at least one spring arm 20 extending in the axial direction X, in particular two to six spring arms. Each spring arm is provided in this connection with a first barb 21 that is directed radially outwards.

The inner ring body 22 comprises an outer ring 23 and an inner ring 24, whereby the outer ring is provided with at least one second barb 25 that is radially directed outwards; in particular with two to six barbs. The inner ring comprises a centric (cylindrical) receiving space 27 for receiving the container tube 15 of the vibration damper 14 (FIG. 1), in particular in conjunction with a plurality of the holding ribs 29.

A receiving space 26 for the second fastening area 9 is located between the collar 19 of the outer ring body 18 and the outer ring of the inner ring body 22, with the second barb 25 of the outer ring 23 extending around the shoulder 11 of the pneumatic spring piston 7 in a supporting manner (FIG. 1).

Now, the outer ring 23 and the inner ring 24 of the inner ring body 22 are connected with each other in a manner such that at least one plug aperture 28, in particular two to six plug apertures are present for receiving the first barb 21 of the outer ring body 18 in a locking manner. The barb 21 extends in this connection around the outer ring 23 of the inner ring body 22.

The spring arms 20 with the first barb 21, the plug windows 28 as well as the second barbs 25 each are arranged equally spaced from each other in the circumferential direction.

What is claimed is:

1. A pneumatic spring arrangement (1) comprising at least the following structural components, specifically
    a pneumatic spring bellows (2) made of elastomer material and enclosing an air chamber (3) with an elastic volume;
    a pneumatic spring cover (4) with a first fastening area (5), on which the one end of the pneumatic spring bellows (2) is secured by means of a clamping ring (6);
    a pneumatic spring piston (7) comprising
        a face area (8) arranged opposite the pneumatic spring cover (4);
        a second fastening area (9) on which the other end of the pneumatic spring bellows is secured by means of
        a clamping ring (10), said clamping ring having an undercut forming a shoulder (11); and
        a lateral roll-off surface (12) on which the pneumatic spring bellows (2) is able to roll off, forming a loop (13); and
    a vibration damper (14) comprising
        a container tube (15) surrounded at least by sections by the pneumatic spring piston (7); and
        a piston rod (16) connected with the pneumatic spring cover (4) and immersing in the container tube (15) in a sliding manner;
characterized in that
    a clamping lock (17) is arranged within the face area (8) and the second fastening area (9) of the pneumatic spring piston (7), said clamping lock being comprised of at least one outer ring body (18) and one inner ring body (22), said ring bodies being individual structural components and capable of being plugged one into another, whereby
        the outer ring body (18), as a one-piece composite body, comprises a collar (19) for receiving the second fastening area (9) in a surrounding manner, and at least one spring arm (20) with a first barb (21), said spring arm extending in the axial direction (X); and
        the inner ring body (22), as a one-piece composite body as well, comprises an outer ring (23) and an inner ring (24), whereby the outer ring is provided with at least one second barb (25) directed radially outwards, said second barb extending around the shoulder (11) of the pneumatic spring piston (7) in a supporting manner; whereby, furthermore, the outer ring (23) and the inner ring (24) are connected with each other in such a manner that at least one plug aperture (28) is present for receiving the first barb (21) in a locking manner.

2. The pneumatic spring arrangement according to claim 1, characterized in that the outer ring body (18) comprises two to six spring arms extending in the circumferential direction (20) and each having a first barb (21).

3. The pneumatic spring arrangement according to claim 2, characterized in that three spring arms (20) are present.

4. The pneumatic spring arrangement according to claim 2, characterized in that the spring arms (20) are arranged equally spaced from each other.

5. The pneumatic spring arrangement according to claim 1, characterized in that the first barb (21) is directed radially outwards.

6. The pneumatic spring arrangement according to claim 1, characterized in that the inner ring body (22) comprises two to six plug apertures (28) in the circumferential direction.

7. The pneumatic spring arrangement according to claim 6, characterized in that six plug apertures (28) are present.

8. The pneumatic spring arrangement according to claim 6, characterized in that the plug apertures (28) are arranged equally spaced from each other.

9. The pneumatic spring arrangement according to claim 1, characterized in that two to six second barbs (25) are present in the circumferential direction.

10. The pneumatic spring arrangement according to claim 9, characterized in that six second barbs (25) are present.

11. The pneumatic spring arrangement according to claim 9, characterized in that the second barbs (25) are arranged equally spaced from each other.

12. The pneumatic spring arrangement according to claim 1, characterized in that the outer ring body (18) and the inner ring body (22) each are made of plastic.

13. The pneumatic spring arrangement according to claim 1, characterized in that the inner ring (24) has a plurality of holding ribs (29) on the inner side, said holding ribs preferably being arranged equally spaced from each other in the circumferential direction.

14. The pneumatic spring arrangement according to claim 1, characterized in that the collar (19) has the shape of a ring.

* * * * *